US010773705B2

United States Patent
Kinoshita

(10) Patent No.: US 10,773,705 B2
(45) Date of Patent: Sep. 15, 2020

(54) CONTROL APPARATUS FOR VEHICLE

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 199 days.

(21) Appl. No.: 16/000,565

(22) Filed: Jun. 5, 2018

(65) Prior Publication Data

US 2019/0047539 A1    Feb. 14, 2019

(30) Foreign Application Priority Data

Aug. 8, 2017    (JP) ................................. 2017-152827

(51) Int. Cl.
*B60W 10/08*    (2006.01)
*B60W 30/19*    (2012.01)
*B60W 10/02*    (2006.01)

(52) U.S. Cl.
CPC .......... *B60W 10/08* (2013.01); *B60W 10/026* (2013.01); *B60W 30/19* (2013.01); *B60W 2520/00* (2013.01)

(58) Field of Classification Search
CPC ....... B60W 10/06; B60W 10/08; B60W 10/26
See application file for complete search history.

(56) References Cited

U.S. PATENT DOCUMENTS

| 2002/0116099 | A1 | 8/2002 | Tabata et al. |
| 2004/0102286 | A1 | 5/2004 | Tabata et al. |
| 2004/0158365 | A1 | 8/2004 | Tabata et al. |
| 2012/0184405 | A1 | 7/2012 | Morimura et al. |

(Continued)

FOREIGN PATENT DOCUMENTS

| JP | 2001-182584 A | 7/2001 |
| JP | 2002-089307 A | 3/2002 |
| JP | 2005-313831 A | 11/2005 |

(Continued)

OTHER PUBLICATIONS

Japanese Office Action, dated May 21,2019, in Japanese Application No. 2017-152827 and English Translation thereof.

(Continued)

*Primary Examiner* — Imran K Mustafa
(74) *Attorney, Agent, or Firm* — McGinn I.P. Law Group, PLLC.

(57) ABSTRACT

A control apparatus for a vehicle that includes an engine including an intake valve and an exhaust valve includes an electric generator, a lock up clutch, and a valve timing controller. The valve timing controller is able to control valve timing of the intake valve or the exhaust valve, or both, to a low efficiency region and a high efficiency region. The valve timing controller controls the valve timing to the high efficiency region on the condition that the electric generator performs regenerative power-generation on decelerated travel of the vehicle. The valve timing controller controls the valve timing to the low efficiency region on the condition that the lock up clutch is switched from an engaged state to a disengaged state, with the valve timing having been controlled to the high efficiency region on the decelerated travel.

15 Claims, 14 Drawing Sheets

(56) References Cited

U.S. PATENT DOCUMENTS

2015/0369199 A1* 12/2015 Nakamura .......... F01L 13/0026
                                                            123/179.4
2018/0273037 A1*  9/2018 Okuda .................... F02D 29/06

FOREIGN PATENT DOCUMENTS

| JP | 2010-084612 A | 4/2010 |
| JP | 2012-067631 A | 4/2012 |
| WO | WO 2011/036810 A1 | 3/2011 |

OTHER PUBLICATIONS

Japanese Office Action, dated Jan. 15, 2019, in Japanese Application No. 2017-152827 and English Translation thereof.

* cited by examiner

CONTROL APPARATUS FOR VEHICLE

CROSS-REFERENCE TO RELATED APPLICATIONS

The present application claims priority from Japanese Patent Application No. 2017-152827 filed on Aug. 8, 2017, the entire contents of which are hereby incorporated by reference.

BACKGROUND

The technology relates to a control apparatus for a vehicle that includes an engine.

A vehicle such as an automobile includes an electric generator such as a motor generator, an alternator, and an integrated starter generator (ISG). In many cases, the electric generator is controlled to a regenerative power-generation state on decelerated travel, from viewpoint of enhancement in fuel consumption performance of the vehicle, as described in Japanese Unexamined Patent Application Publication (JP-A) No. 2010-84612. Non-limiting examples of the decelerated travel may include coasting, and braking of the vehicle. Moreover, in a case of regenerative power-generation of the electric generator on the decelerated travel, a control apparatus described in JP-A No 2010-84612 controls valve timing, and thereby reduces a pumping loss of an engine. This makes it possible to reduce an engine load, and to increase a power-generation load, leading to an increase in power-generated electric power of the electric generator, and the enhancement in the fuel consumption performance of the vehicle.

SUMMARY

An aspect of the technology provides a control apparatus for a vehicle that includes an engine including an intake valve and an exhaust valve. The control apparatus includes an electric generator, a lock up clutch, and a valve timing controller. The electric generator is configured to be coupled to the engine. The lock up clutch is configured to be coupled to the engine. The valve timing controller is configured to control valve timing of the intake valve or the exhaust valve, or both. The valve timing controller is configured to control the valve timing to a low efficiency region and a high efficiency region. The low efficiency region is a region in which charging efficiency of the engine is lowered to a lower value than a threshold. The high efficiency region is a region in which the charging efficiency of the engine is raised to a higher value than the threshold. The valve timing controller is configured to control the valve timing to the high efficiency region on the condition that the electric generator performs regenerative power-generation on decelerated travel of the vehicle. The valve timing controller is configured to control the valve timing to the low efficiency region on the condition that the lock up clutch is switched from an engaged state to a disengaged state, with the valve timing having been controlled to the high efficiency region on the decelerated travel.

An aspect of the technology provides a control apparatus for a vehicle that includes an engine including an intake valve and an exhaust valve. The control apparatus includes an electric generator, a lock up clutch, and circuitry. The electric generator is configured to be coupled to the engine. The lock up clutch is configured to be coupled to the engine. The circuitry is configured to control valve timing of the intake valve or the exhaust valve, or both. The circuitry is configured to control the valve timing to a low efficiency region and a high efficiency region. The low efficiency region is a region in which charging efficiency of the engine is lowered to a lower value than a threshold. The high efficiency region is a region in which the charging efficiency of the engine is raised to a higher value than the threshold. The circuitry is configured to control the valve timing to the high efficiency region on the condition that the electric generator performs regenerative power-generation on decelerated travel of the vehicle. The circuitry is configured to control the valve timing to the low efficiency region on the condition that the lock up clutch is switched from an engaged state to a disengaged state, with the valve timing having been controlled to the high efficiency region on the decelerated travel.

DETAILED DESCRIPTION

Figure 1:
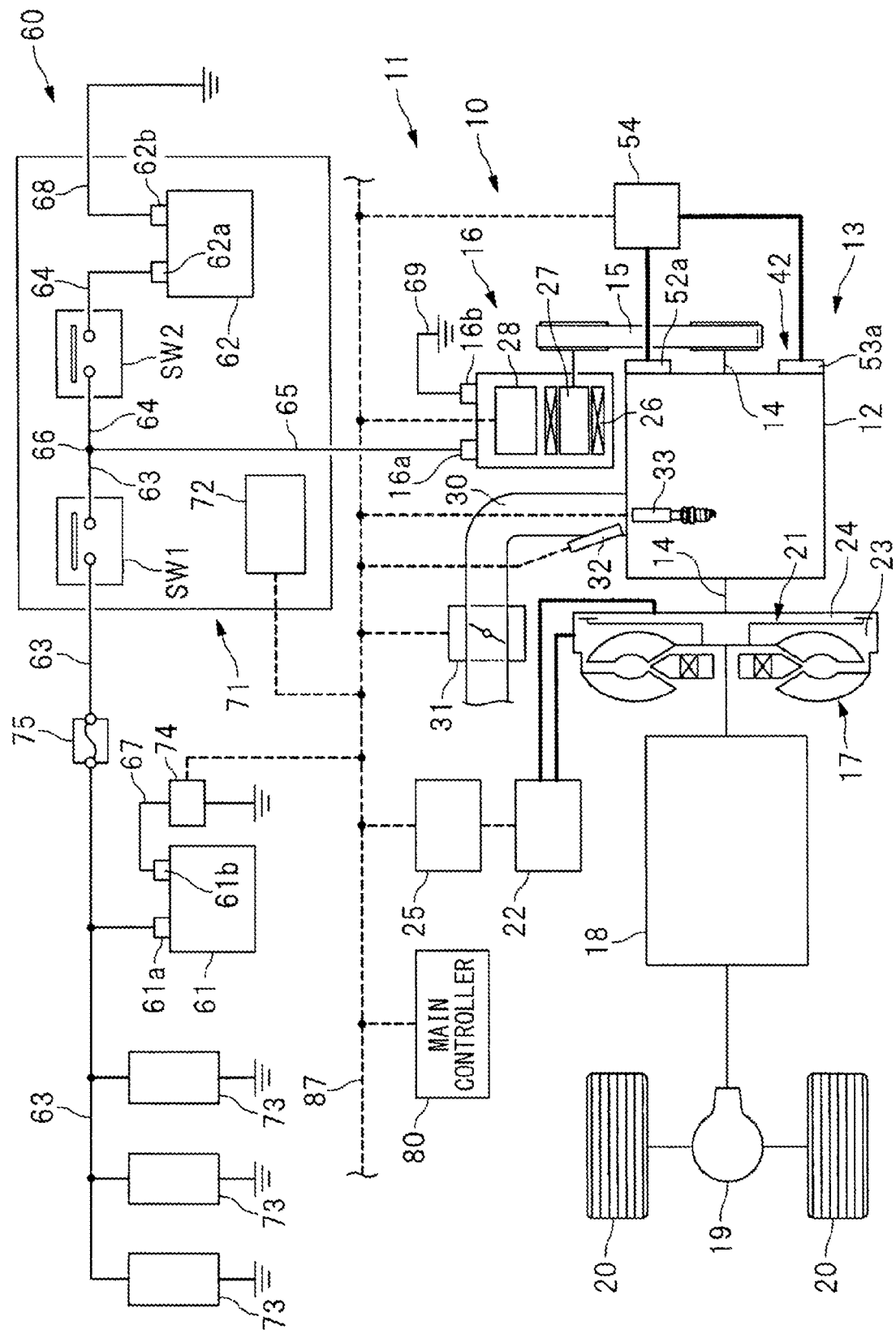
FIG. 1 schematically illustrates a vehicle provided with a control apparatus for a vehicle according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

With a pumping loss of an engine being reduced by a valve timing control, an amount of intake air of the engine increases. In this state, a restart of fuel injection into the engine may cause possibility of an excessive output of engine torque. Such an excessive output of the engine torque in accompaniment with the fuel injection may constitute a possible cause of a sense of incongruity given to an occupant. What is therefore desired is to reduce the engine torque to be outputted in accompaniment with the restart of the fuel injection, even in a case where an engine load is reduced, on decelerated travel, to get an adequate amount of the power-generated electric power.

It is desirable to provide a control apparatus for a vehicle that makes it possible to reduce engine torque to be outputted in accompaniment with a restart of fuel injection.

FIG. 1 is a schematic diagram illustrating a vehicle 11 provided with a control apparatus for a vehicle 10 according to an example implementation of the technology. Referring to FIG. 1, on the vehicle 11, a power unit 13 may be mounted. The power unit 13 may include an engine 12 that serves as an internal combustion engine. The engine 12 may include a crankshaft 14 to which a starter generator 16 is mechanically coupled via a belt mechanism 15. To the engine 12, a transmission mechanism 18 may also be coupled via a torque converter 17. To the transmission mechanism 18, wheels 20 may be coupled via, for example, a differential mechanism 19. In one implementation, the starter generator 16 may serve as an "electric generator".

The torque converter 17 may be coupled to the engine 12. In the torque converter 17, a lock up clutch 21 may be incorporated. In other words, to the engine 12, the lock up clutch 21 is coupled. Controlling the lock up clutch 21 to an engaged state causes the engine 12 and the transmission mechanism 18 to be coupled via the lock up clutch 21. Controlling the lock up clutch 21 to a disengaged state causes the engine 12 and the transmission mechanism 18 to be coupled via the torque converter 17. To the torque converter 17, a valve unit 22 may be coupled. The valve unit 22 may include a plurality of solenoid valves and oil paths. Controlling oil pressures of an apply chamber 23 and a release chamber 24 with the use of the valve unit 22 causes the lock up clutch 21 to be controlled to the engaged state and to the disengaged state. Thus, the valve unit 22 may control the lock up clutch 21. The valve unit 22 may be controlled by a mission controller 25. The mission controller 25 may include, for example, a microcomputer.

The starter generator 16 is coupled to the engine 12. The starter generator 16 may be a so-called integrated starter generator (ISG) that serves both as an electric generator and an electric motor. The starter generator 16 may serve not only as the electric generator to be driven by the crankshaft 14 but also as the electric motor that causes rotation of the crankshaft 14. The starter generator 16 may be controlled to a powering state, for example, in restarting the engine 12 in an idling stop control, and in performing an assistance drive of the engine 12 at the time of a start or acceleration. The starter generator 16 may include a stator 26 having a stator coil and a rotor 27 having a field coil. The starter generator 16 may further include an ISG controller 28 in order to control an electrically conductive state of each of the stator coil and the field coil. The ISG controller 28 may include, for example, an inverter, a regulator, and a microcomputer. The ISG controller 28 may control the electrically conductive state of each of the field coil and the stator coil, thus controlling, for example, a power-generation voltage, power-generation torque, and powering torque of the starter generator 16.

The engine 12 may include an intake manifold 30. The intake manifold 30 may include a throttle valve 31 that controls an amount of intake air. Opening the throttle valve 31 causes an increase in the amount of the intake air of the engine 12. Closing the throttle valve 31 causes a decrease in the amount of the intake air of the engine 12. Moreover, the engine 12 may include an injector 32 that injects fuel into an intake port 50 and a combustion chamber. Allowing the injector 32 to inject the fuel causes the engine 12 to be controlled to a fuel injection state. Stopping fuel injection from the injector 32 causes the engine 12 to be controlled to a fuel cut state. Furthermore, the engine 12 may include an ignition device 33 including an ignitor and an ignition coil. Allowing the ignition device 33 to control ignition timing makes it possible to control, for example, output torque of the engine 12 and a combustion temperature. It is to be noted that the throttle valve 31, the injector 32, and the ignition device 33 may be controlled by a main controller 80 described later.

[Variable Valve Mechanism]

Figure 2:
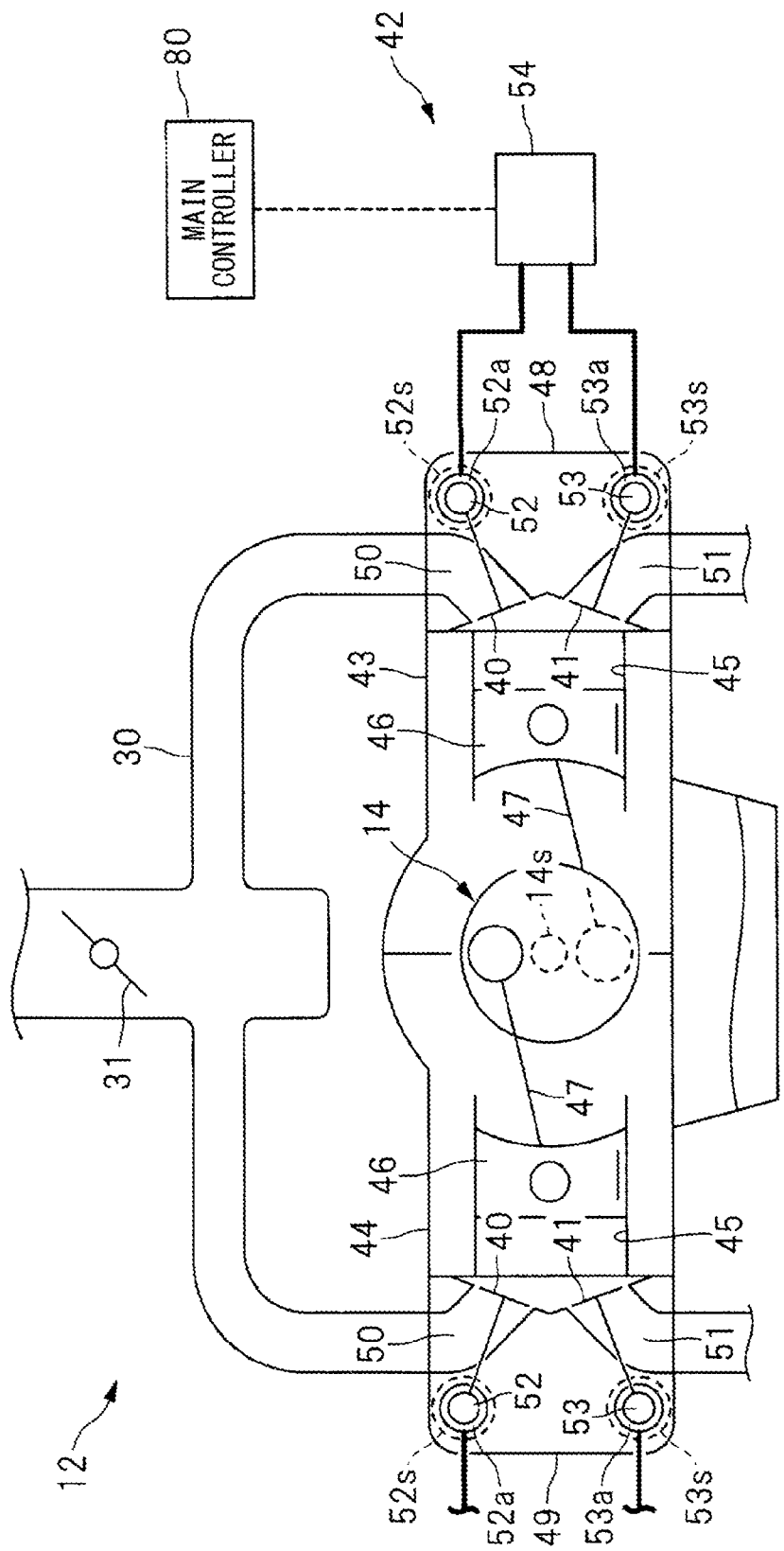
FIG. 2 schematically illustrates an internal structure of an engine.

In the engine 12, a variable valve mechanism 42 may be provided. The variable valve mechanism 42 may control valve timing of an intake valve 40 and an exhaust valve 41. FIG. 2 schematically illustrates an internal structure of the engine 12. Referring to FIG. 2, in the engine 12, a pair of cylinder blocks 43 and 44 may be provided. Each of the cylinder blocks 43 and 44 may include a cylinder bore 45 that accommodates a piston 46. To the piston 46, the crankshaft 14 may be coupled via a connecting rod 47. To the cylinder blocks 43 and 44, cylinder heads 48 and 49 may be coupled. The cylinder heads 48 and 49 may include the variable valve mechanism 42. In the cylinder heads 48 and 49, the intake ports 50 and the intake valves 40 may be formed. The intake ports 50 may guide the intake air to the combustion chamber. The intake valves 40 may open and close the intake ports 50. Moreover, in the cylinder heads 48 and 49, exhaust ports 51 and the exhaust valves 41 may be provided. The exhaust ports 51 may guide exhaust gas from the combustion chamber. The exhaust valves 41 may open and close the exhaust ports 51.

The cylinder heads 48 and 49 may include intake camshafts 52 and exhaust camshafts 53. The intake camshafts 52 may open and close the intake valves 40. The exhaust camshafts 53 may open and close the exhaust valves 41. To the intake camshafts 52, cam sprockets 52s may be attached via hydraulic actuators 52a. To the exhaust camshafts 53, cam sprockets 53s may be attached via hydraulic actuators 53a. Furthermore, to the crankshaft 14, a crank sprocket 14s may be attached. Round the crank sprocket 14s, the cam sprockets 52s, and the cam sprockets 53s, an undepicted timing chain may be wound, causing the rotation of the crankshaft 14 to be transmitted to the intake camshafts 52 and the exhaust camshafts 53 via the timing chain.

To the hydraulic actuators 52a and 53a, a valve unit 54 may be coupled. The valve unit 54 may include a plurality of solenoid valves and oil paths. Controlling the hydraulic actuators 52a and 53a with the use of the valve unit 54 makes it possible to adjust phases of the intake camshafts 52 and the cam sprockets 52s, and to adjust phases of the exhaust camshafts 53 and the cam sprockets 53s. In other words, controlling the hydraulic actuators 52a and 53a makes it possible to control the valve timing, i.e., open and close timing of the intake valve 40, and to control the valve timing, i.e., open and close timing of the exhaust valve 41. It is to be noted that the valve unit 54 may supply hydraulic oil to the hydraulic actuators 52a and 53a, and be controlled by the main controller 80 described later. It is to be noted that the variable valve mechanism 42 as illustrated by way of example may be able to control the valve timing of the intake valve 40 to retard angle side, and to control the valve timing of the exhaust valve 41 to advance angle side and retard angle side.

[Charging Efficiency of Engine]

Figure 3:
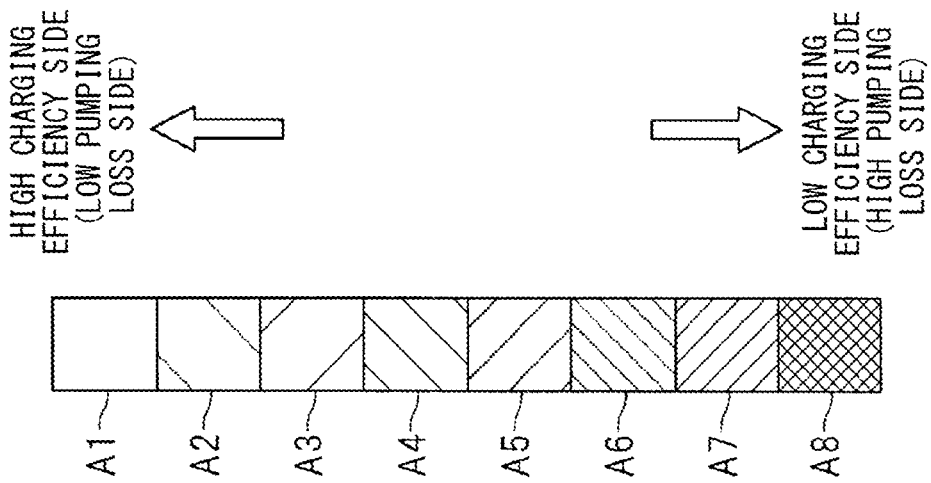
FIG. 3 illustrates an example of relation between valve timing and charging efficiency.
Figure 3:
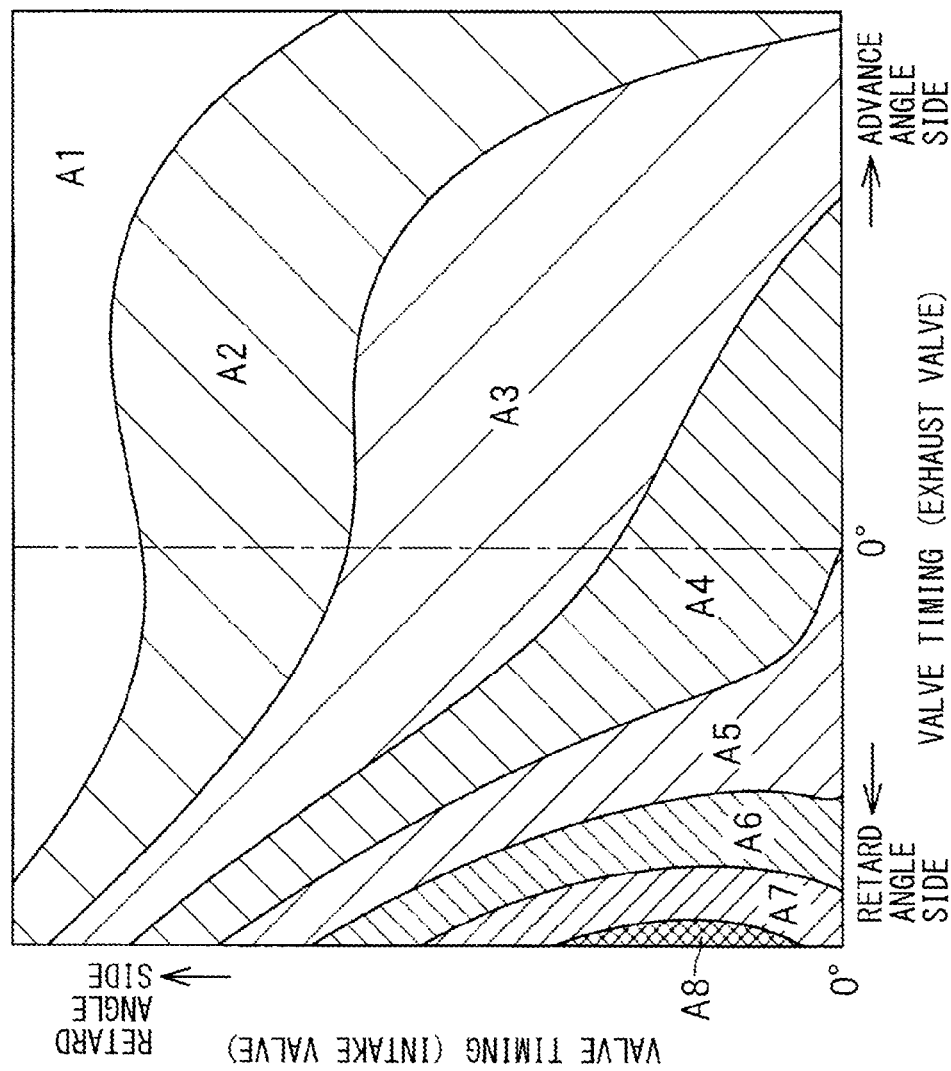

FIG. 3 illustrates an example of relation between the valve timing and charging efficiency. It is to be noted that FIG. 3 illustrates regions of the charging efficiency of the intake air, in a case where a throttle plate position is controlled to 10° and the number of rotations of the engine is controlled to 3000 rpm.

Referring to FIG. 3, controlling the valve timing of the intake valve 40 to the retard angle side and controlling the valve timing of the exhaust valve 41 to the advance angle side or the retard angle side makes it possible to control the valve timing in a region A1. Thus, controlling the valve timing in the region A1 makes it possible to enhance the charging efficiency of the intake air of the engine 12. In other words, controlling the valve timing in the region A1 makes it possible to increase the amount of the intake air of the engine 12, leading to a decrease in a pumping loss of the engine 12.

Meanwhile, controlling the valve timing of the intake valve 40 to neutral side, i.e., 0° side, and controlling the valve timing of the exhaust valve 41 to the retard angle side makes it possible to control the valve timing in a region A8. Thus, controlling the valve timing in the region A8 makes it possible to lower the charging efficiency of the intake air of the engine 12. In other words, controlling the valve timing in the region A8 makes it possible to decrease the amount of the intake air of the engine 12, leading to an increase in the pumping loss of the engine 12.

Figure 4:
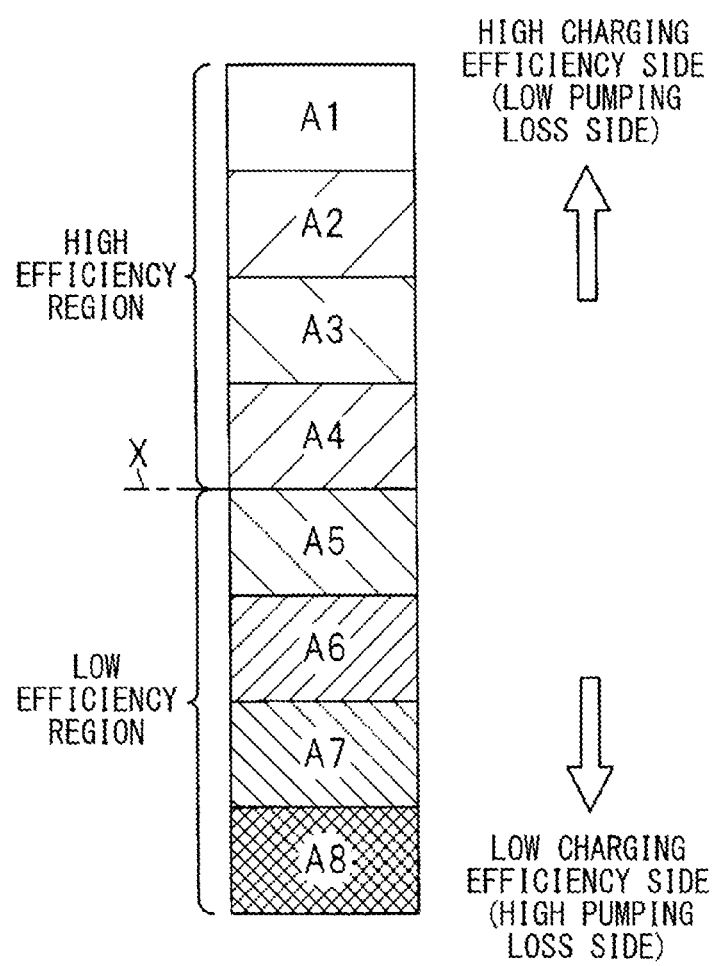
FIG. 4 illustrates an example of a high efficiency region and a low efficiency region.

FIG. 4 illustrates an example of a high efficiency region and a low efficiency region. It is to be noted that in FIG. 4, the same regions as those in FIG. 3 are denoted by the same reference characters. Referring to FIG. 4, regions A1, A2, A3, and A4 may be set as the high efficiency region. The regions A1 to A4 are regions in which the charging efficiency of the engine 12 is raised to a higher value than a predetermined threshold X. Controlling the valve timing to the high efficiency region, i.e., the regions A1 to A4, makes it possible to increase the intake air charged inside the cylinders, leading to reduction in the pumping loss of the engine 12. Meanwhile, regions A5, A6, A7, and A8 may be set as the low efficiency region. The regions A5 to A8 are regions in which the charging efficiency of the engine 12 is lowered to a lower value than the predetermined threshold X. Controlling the valve timing to the low efficiency region, i.e., the regions A5 to A8, makes it possible to decrease the intake air charged inside the cylinders, leading to the increase in the pumping loss of the engine 12.

[Power Supply Circuit]

Figure 5:
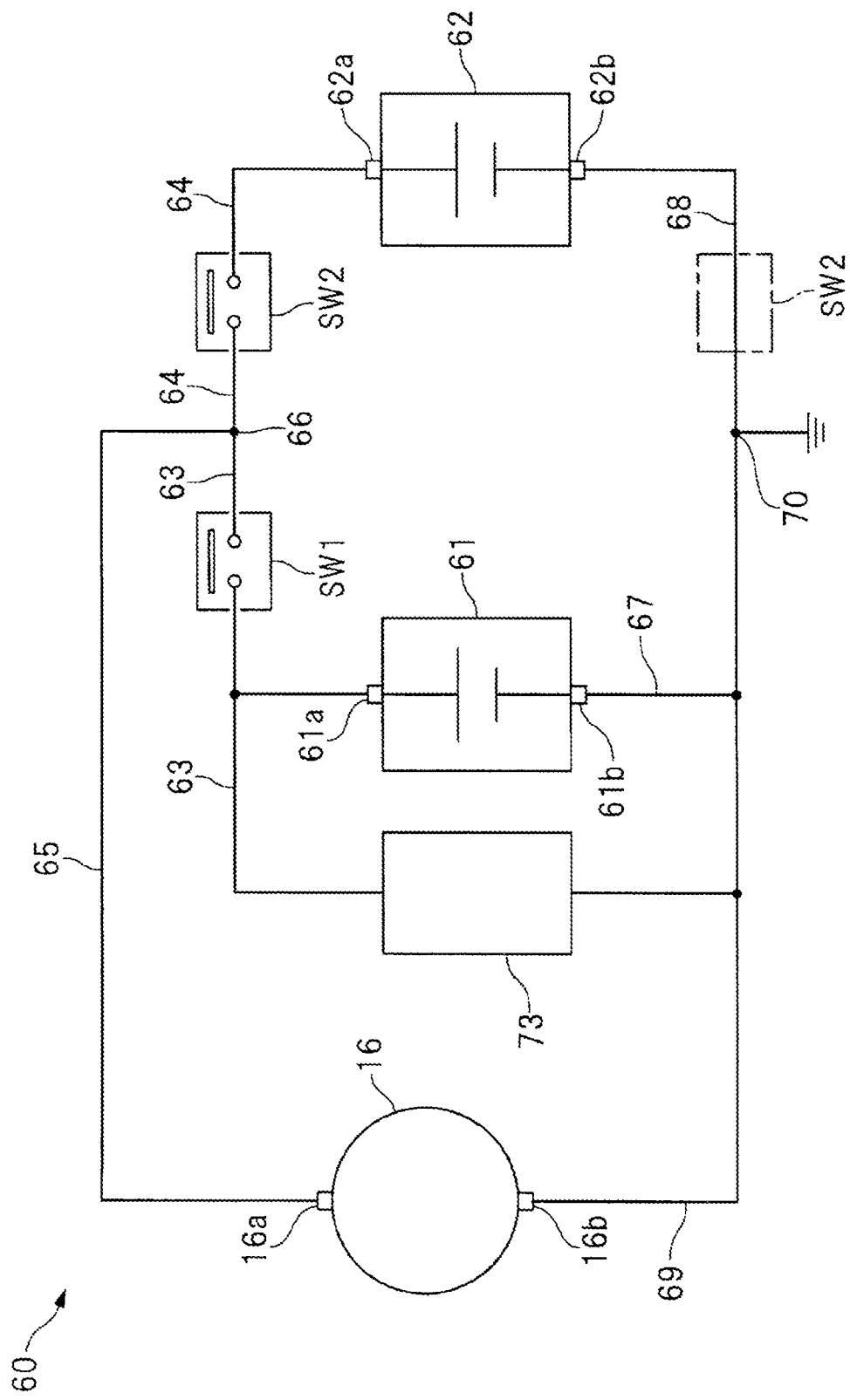
FIG. 5 is a circuit diagram illustrating an example of a power supply circuit.

A description is given of a power supply circuit 60 to be mounted on the vehicle 11. FIG. 5 is a circuit diagram illustrating an example of the power supply circuit 60. Referring to FIG. 5, the power supply circuit 60 may include a lead battery 61 and a lithium-ion battery 62. The lead battery 61 may be electrically coupled to the starter generator 16. The lithium-ion battery 62 may be electrically coupled to the starter generator 16, in parallel to the lead battery 61. A terminal voltage of the lithium-ion battery 62 may be higher in design than a terminal voltage of the lead battery 61, in order to actively cause discharge of the lithium-ion battery 62. Further, internal resistance of the lithium-ion battery 62 may be smaller in design than internal resistance of the lead battery 61, in order to actively cause charge and the discharge of the lithium-ion battery 62. Thus, to the starter generator 16, coupled in parallel may be the lead battery 61 and the lithium-ion battery 62 that differ in the internal resistance from each other.

The lead battery 61 may include a positive electrode terminal 61a coupled to a positive electrode line 63. The lithium-ion battery 62 may include a positive electrode terminal 62a coupled to a positive electrode line 64. The starter generator 16 may include a positive electrode terminal 16a coupled to a positive electrode line 65. These positive electrode lines 63 to 65 may be coupled to one another via a node 66. The lead battery 61 may include a negative electrode terminal 61b coupled to a negative electrode line 67. The lithium-ion battery 62 may include a negative electrode terminal 62b coupled to a negative electrode line 68. The starter generator 16 may include a negative electrode terminal 16b coupled to a negative electrode line 69. These negative electrode lines 67 to 69 may be coupled to one another via a reference potential point 70.

On the positive electrode line 63 of the lead battery 61, a switch SW1 may be provided. The switch SW1 may be switched between an electrically conductive state and a cutoff state. Controlling the switch SW1 to the electrically conductive state causes the starter generator 16 and the lead battery 61 to be coupled to each other. Controlling the switch SW1 to the cutoff state causes the starter generator 16 and the lead battery 61 to be isolated from each other. Further, on the positive electrode line 64 of the lithium-ion battery 62, a switch SW2 may be provided. The switch SW2 may be switched between an electrically conductive state and a cutoff state. Controlling the switch SW2 to the electrically conductive state causes the starter generator 16 and the lithium-ion battery 62 to be coupled to each other. Controlling the switch SW2 to the cutoff state causes the starter generator 16 and the lithium-ion battery 62 to be isolated from each other. The switch SW1 and the switch SW2 may each be a switch including a semiconductor element such as, but not limited to, a metal-oxide-semiconductor field-effect transistor (MOSFET). In an alternative implementation, the switch SW1 and the switch SW2 may each be a switch that mechanically opens and closes a contact by means of, for example, electromagnetic force. It is to be noted that the switch SW1 and the switch SW2 are each referred to as, for example, a relay or a contactor as well.

As illustrated in FIG. 1, the power supply circuit 60 may include a battery module 71. In the battery module 71, incorporated may be the lithium-ion battery 62, and the switches SW1 and SW2. The battery module 71 may further include a battery controller 72. The battery controller 72 may include, for example, a microcomputer. The battery controller 72 may have a monitoring function and a control function. Non-limiting examples of the monitoring function may include monitoring of a state of charge SOC, a charge current, a discharge current, the terminal voltage, a cell temperature, and the internal resistance of the lithium-ion battery 62. Non-limiting examples of the control function may include controlling the switches SW1 and SW2. It is to be noted that the state of charge SOC refers to a ratio of an electricity storage amount of the battery to a designed capacity of the battery.

Moreover, to the positive electrode line 63 of the lead battery 61, a plurality of electric devices 73 may be coupled.

On the negative electrode line 67 of the lead battery 61, a battery sensor 74 may be provided. The battery sensor 74 may have a detection function. Non-limiting examples of the detection function may include detection of a charge current, a discharge current, the terminal voltage, a state of charge SOC of the lead battery 61. It is to be noted that on the positive electrode line 63, a fuse 75 may be provided. The fuse 75 may protect, for example, the electric devices 73.

[Control System of Control Apparatus for Vehicle]

Figure 6:
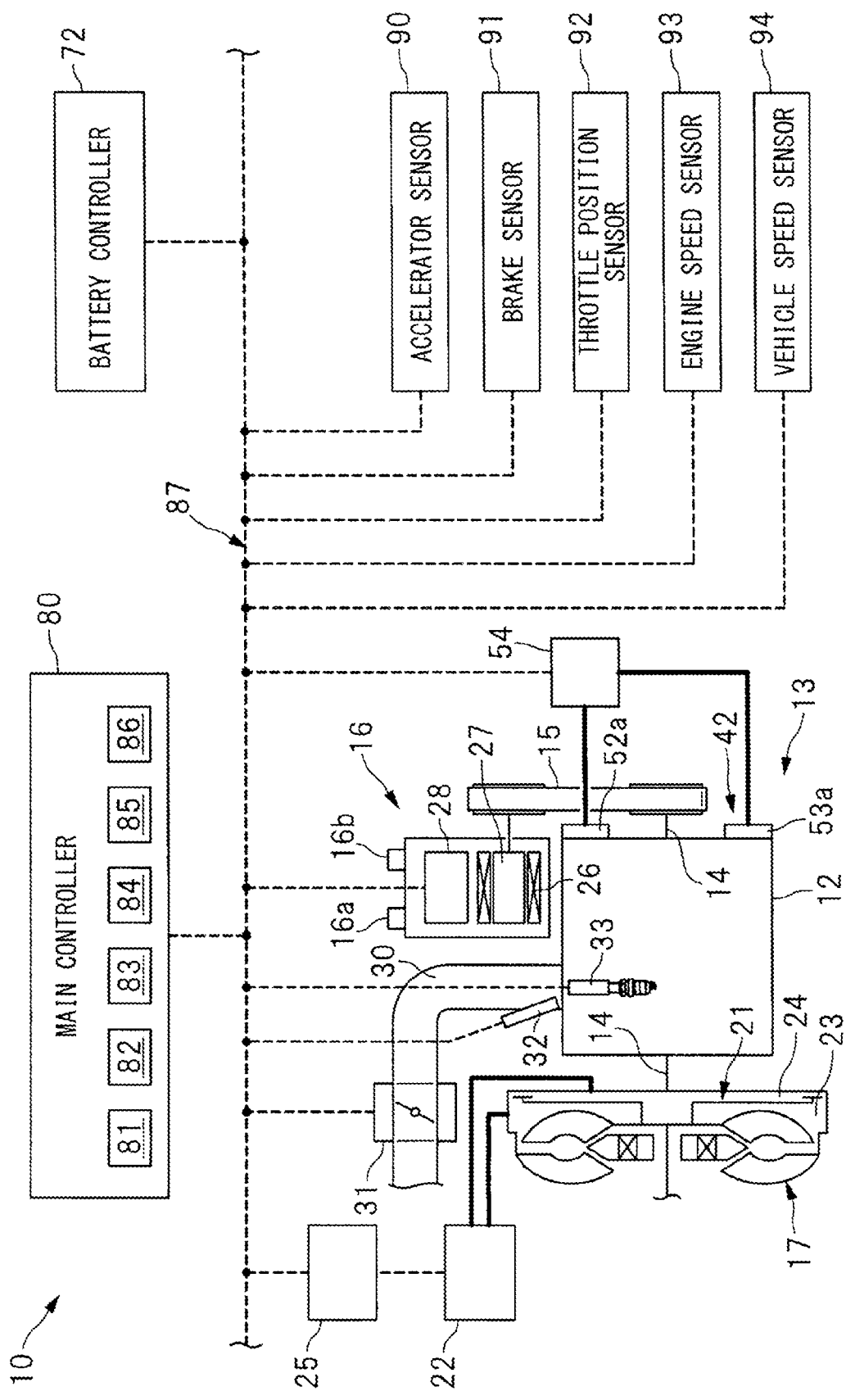
FIG. 6 schematically illustrates a control system of the control apparatus for the vehicle.

Described is a control system of the control apparatus for the vehicle 10. FIG. 6 is a schematic diagram of the control system of the control apparatus for the vehicle 10. Referring to FIGS. 1 and 6, the control apparatus for the vehicle 10 may include the main controller 80. The main controller 80 may control, for example, the starter generator 16, the throttle valve 31, the variable valve mechanism 42, the lock up clutch 21, the injector 32, and the ignition device 33. The main controller 80 may include, for example, a microcomputer. The main controller 80 may include a plurality of control units that output control signals to respective devices. Non-limiting examples of the control units to be provided in the main controller 80 may include an electric generator control unit 81, a throttle control unit 82, a valve timing control unit 83, a clutch control unit 84, an injector control unit 85, and an ignition control unit 86. The electric generator control unit 81 may control the starter generator 16. The throttle control unit 82 may control the throttle valve 31. The valve timing control unit 83 may control the variable valve mechanism 42. The clutch control unit 84 may control the lock up clutch 21. The injector control unit 85 may control the injector 32. The ignition control unit 86 may control the ignition device 33.

The main controller 80, and the controllers 25, 28, and 72 as mentioned above may be so coupled to one another as to be able to perform a communication mutually and freely via an on-vehicle network 87. Non-limiting examples of the on-vehicle network 87 may include a controller area network (CAN) and a local interconnect network (LIN). The main controller 80 may control, for example, the starter generator 16, the throttle valve 31, the variable valve mechanism 42, the lock up clutch 21, the injector 32, and the ignition device 33, on the basis of information from various controllers and sensors. It is to be noted that the valve timing control unit 83 of the main controller 80 may control the variable valve mechanism 42 through the valve unit 54, and thereby control the valve timing to the low efficiency region and the high efficiency region. Moreover, the electric generator control unit 81 of the main controller 80 may output a control signal to the ISG controller 28, and thereby control, for example, the power-generation voltage and the power-generation torque of the starter generator 16. Furthermore, the clutch control unit 84 of the main controller 80 may output a control signal to the mission controller 25, and thereby control the lock up clutch 21 to the engaged state or the disengaged state.

As illustrated in FIG. 6, non-limiting examples of the sensors to be coupled to the main controller 80 may include an accelerator sensor 90, a brake sensor 91, a throttle position sensor 92, an engine speed sensor 93, and a vehicle speed sensor 94. The accelerator sensor 90 may detect an operation state of an accelerator pedal. The brake sensor 91 may detect an operation state of a brake pedal. The throttle position sensor 92 may detect the throttle plate position of the throttle valve 31. The engine speed sensor 93 may detect the number of rotations of the engine, i.e., a rotation speed of the engine 12. The vehicle speed sensor 94 may detect a vehicle speed, i.e., a travel speed of the vehicle 11. Moreover, the main controller 80 may be supplied, from the ISG controller 28, with information regarding, for example, the power-generation voltage and the power-generation torque of the starter generator 16. The main controller 80 may be supplied, from the mission controller 25, with information regarding, for example, an operation state of the lock up clutch 21. The main controller 80 may be supplied, from the battery controller 72, with information regarding, for example, the state of charge SOC of the lithium-ion battery 62.

[Power Supply States]

Figure 7:
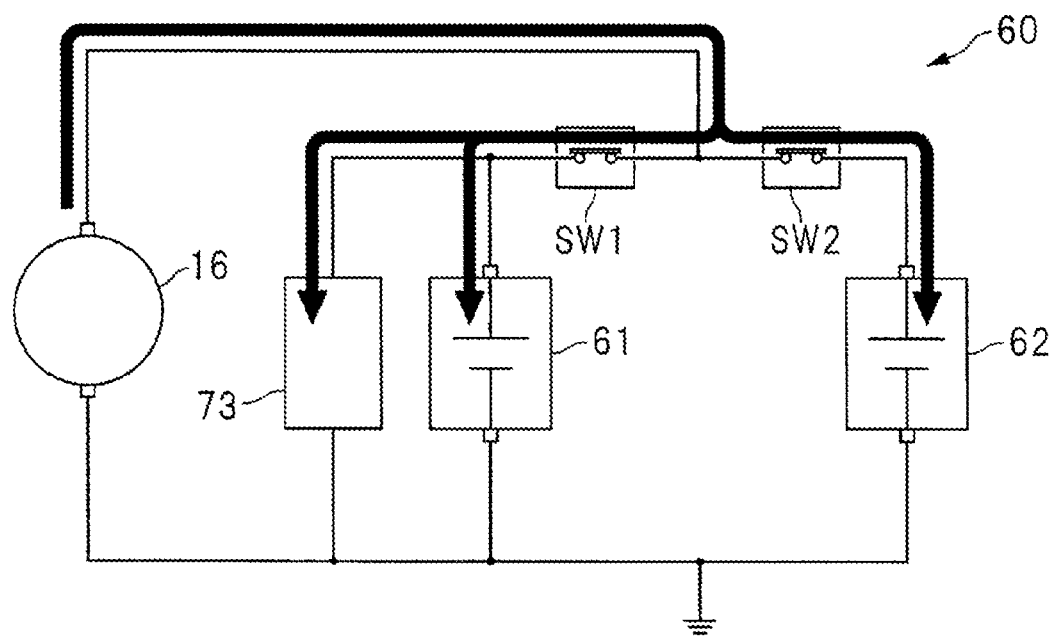
FIG. 7 describes an example of a power supply state, with a starter generator being controlled to a combustion power-generation state.
Figure 8:
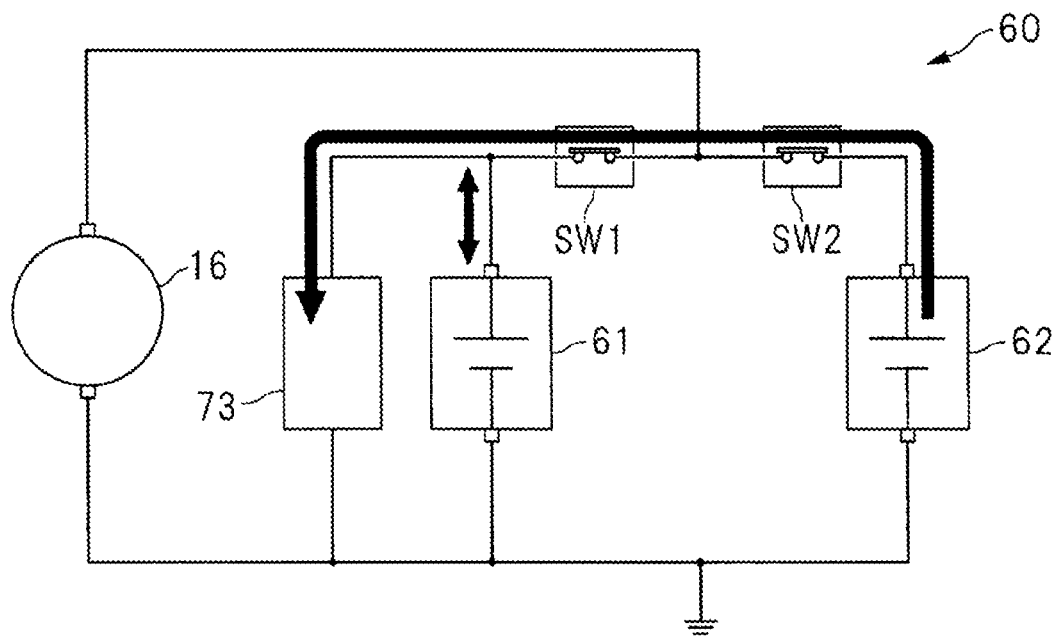
FIG. 8 describes an example of the power supply state, with the starter generator being controlled to a power-generation suspended state.
Figure 9:
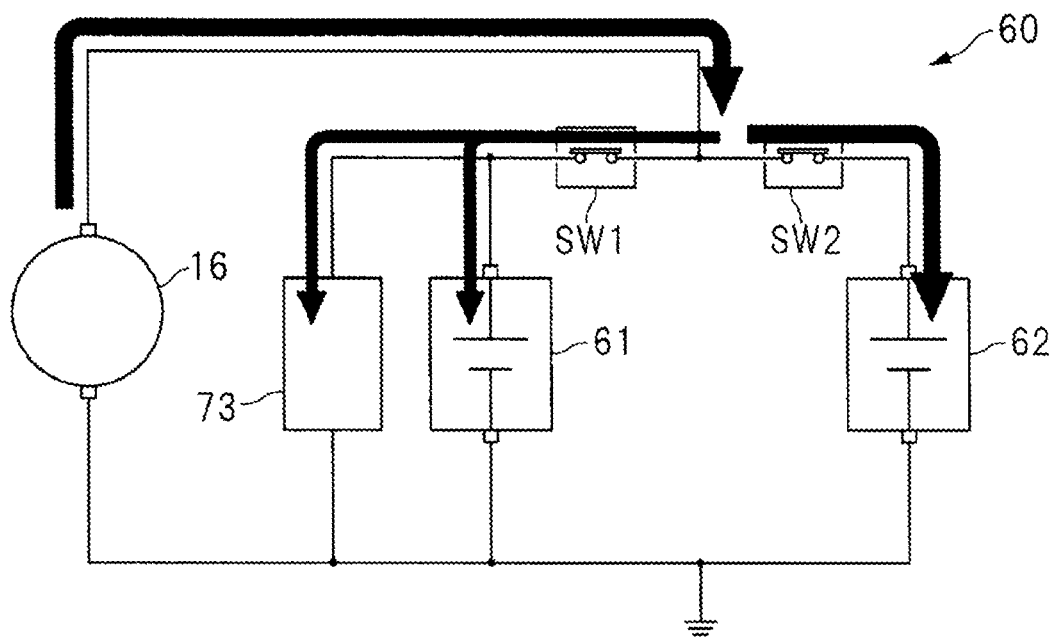
FIG. 9 describes an example of the power supply state, with the starter generator being controlled to a regenerative power-generation state.
Figure 10:
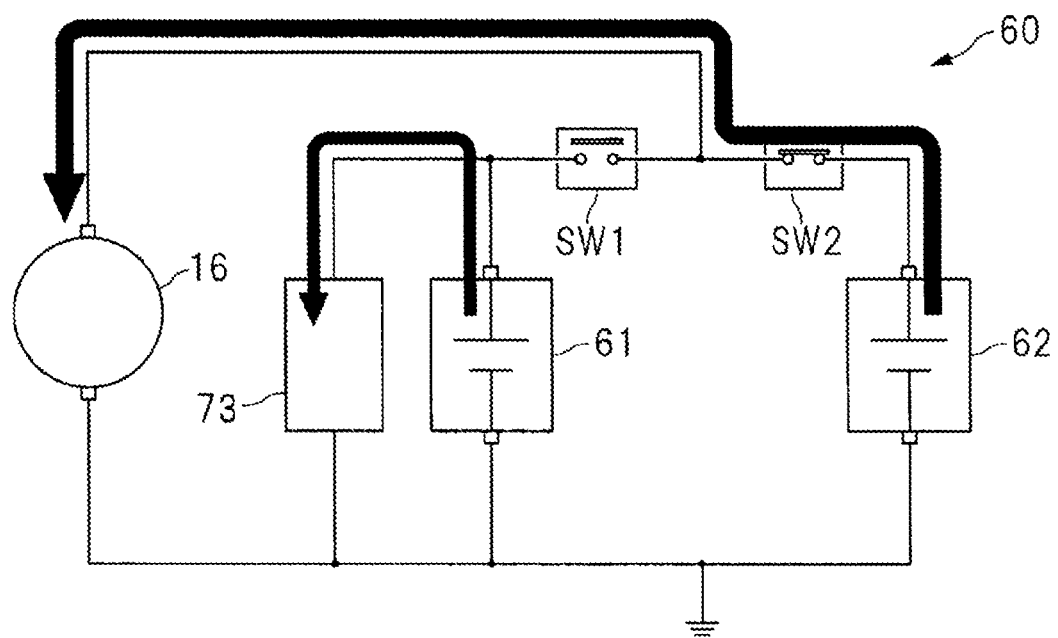
FIG. 10 describes an example of the power supply state, with the starter generator being controlled to a powering state.

A description is given of power supply states in accompaniment with a power-generation control and a powering control of the starter generator 16. FIG. 7 illustrates one example of the power supply state, with the starter generator 16 being controlled to a combustion power-generation state. FIG. 8 illustrates one example of the power supply state, with the starter generator 16 being controlled to a power-generation suspended state. FIG. 9 illustrates one example of the power supply state, with the starter generator 16 being controlled to a regenerative power-generation state. FIG. 10 illustrates one example of the power supply state, with the starter generator 16 being controlled to the powering state.

Referring to FIG. 7, in a case where an electricity storage amount of the lithium-ion battery 62 has lowered, the starter generator 16 may be controlled to the combustion power-generation state. In other words, in a case where the state of charge SOC of the lithium-ion battery 62 is lower than a predetermined lower limit, the starter generator 16 may be controlled to the combustion power-generation state, in order to charge the lithium-ion battery 62 and to increase the state of charge SOC. In controlling the starter generator 16 to the combustion power-generation state, the power-generation voltage of the starter generator 16 may be raised to a greater value than the terminal voltage of the lithium-ion battery 62. This causes power-generated electric power to be supplied from the starter generator 16 to, for example, the lithium-ion battery 62, the electric devices 73, and the lead battery 61, as denoted by black arrows in FIG. 7. It is to be noted that the combustion power-generation state of the starter generator 16 means a state in which the starter generator 16 is driven by the engine 12, to generate electric power.

Referring to FIG. 8, in a case where the electricity storage amount of the lithium-ion battery 62 is sufficient, the starter generator 16 may be controlled to the power-generation suspended state. In other words, in a case where the state of charge SOC of the lithium-ion battery 62 is higher than a predetermined upper limit, the starter generator 16 may be controlled to the power-generation suspended state, in order to prompt the lithium-ion battery 62 to discharge, and to reduce the engine load. In controlling the starter generator 16 to the power-generation suspended state, the power-generation voltage of the starter generator 16 may be lowered to a smaller value than the terminal voltage of the lithium-ion battery 62. This causes electric power to be supplied from the lithium-ion battery 62 to, for example, the electric devices 73, as denoted by a black arrow in FIG. 8. Hence, it is possible to suppress or stop power generation of the starter generator 16, and to reduce the engine load.

As mentioned above, the main controller 80 may control the starter generator 16 to the combustion power-generation state or the power-generation suspended state on the basis of the state of charge SOC. Meanwhile, on decelerated travel, it is necessary to recover much kinetic energy, and to enhance fuel consumption performance. Therefore, on the decelerated travel, the starter generator 16 may be controlled to the regenerative power-generation state, and the power-generation voltage of the starter generator 16 may be raised within a range in which the power-generation voltage of the starter generator 16 is not higher than withstanding voltages of, for example, the lead battery 61, the lithium-ion battery 62, and the electric devices 73. This makes it possible to increase the power-generated electric power of the starter generator 16. It is therefore possible to actively convert the kinetic energy to electric energy, and recover the electric energy, leading to enhancement in energy efficiency of the vehicle 11 and enhancement in the fuel consumption performance.

As described above, whether or not to control the starter generator 16 to the regenerative power-generation state may be determined on the basis of, for example, the operation states of the accelerator pedal and the brake pedal. Specifically, in coasting, stepping down of the accelerator pedal or the brake pedal is released. In braking of the vehicle, the brake pedal is stepped down. In these cases, a fuel cut of the engine 12 may be performed, resulting in deceleration of the vehicle 11. Thus, the starter generator 16 may be controlled to the regenerative power-generation state. In contrast, on accelerated travel or on steady travel, the accelerator pedal is stepped down. In this case, the fuel injection into the engine 12 may be performed. Thus, the starter generator 16 may be controlled to the combustion power-generation state or the power-generation suspended state.

In controlling the starter generator 16 to the regenerative power-generation state, the power-generation voltage of the starter generator 16 may be raised within the range in which the power-generation voltage of the starter generator 16 is not higher than the withstanding voltages of, for example, the lead battery 61, the lithium-ion battery 62, and the electric devices 73. This causes a large current to be supplied from the starter generator 16 to the lithium-ion battery 62 and the lead battery 61, as denoted by black arrows in FIG. 9, making it possible to rapidly charge the lithium-ion battery 62 and the lead battery 61. It is to be noted that because the internal resistance of the lithium-ion battery 62 is smaller than the internal resistance of the lead battery 61, most of the power-generated current is supplied to the lithium-ion battery 62.

As illustrated in FIGS. 7 to 9, in controlling the starter generator 16 to the combustion power-generation state, the regenerative power-generation state, and the power-generation suspended state, the switches SW1 and SW2 may be maintained in the electrically conductive state. In other words, it is possible to control the charge and the discharge of the lithium-ion battery 62, without making a switching control of the switches SW1 and SW2, solely by controlling the power-generation voltage of the starter generator 16. It is therefore possible to easily control the charge and the discharge of the lithium-ion battery 62, and to enhance durability of the switches SW1 and SW2.

Moreover, as illustrated in FIG. 10, in controlling the starter generator 16 to the powering state, the switch SW1 may be switched from the electrically conductive state to the cutoff state. In other words, the switch SW1 may be switched from the electrically conductive state to the cutoff state, in a case where the starter generator 16 brings the engine 12 to starting rotation, and in a case where the starter generator 16 performs the assistance drive of the engine 12. This makes it possible to prevent an instantaneous voltage drop with respect to, for example, the electric devices 73, even in a case with a supply of a large current from the lithium-ion battery 62 to the starter generator 16. It is therefore possible to allow, for example, the electric devices 73 to function normally.

[Regenerative Power-Generation Control]

Figure 11:
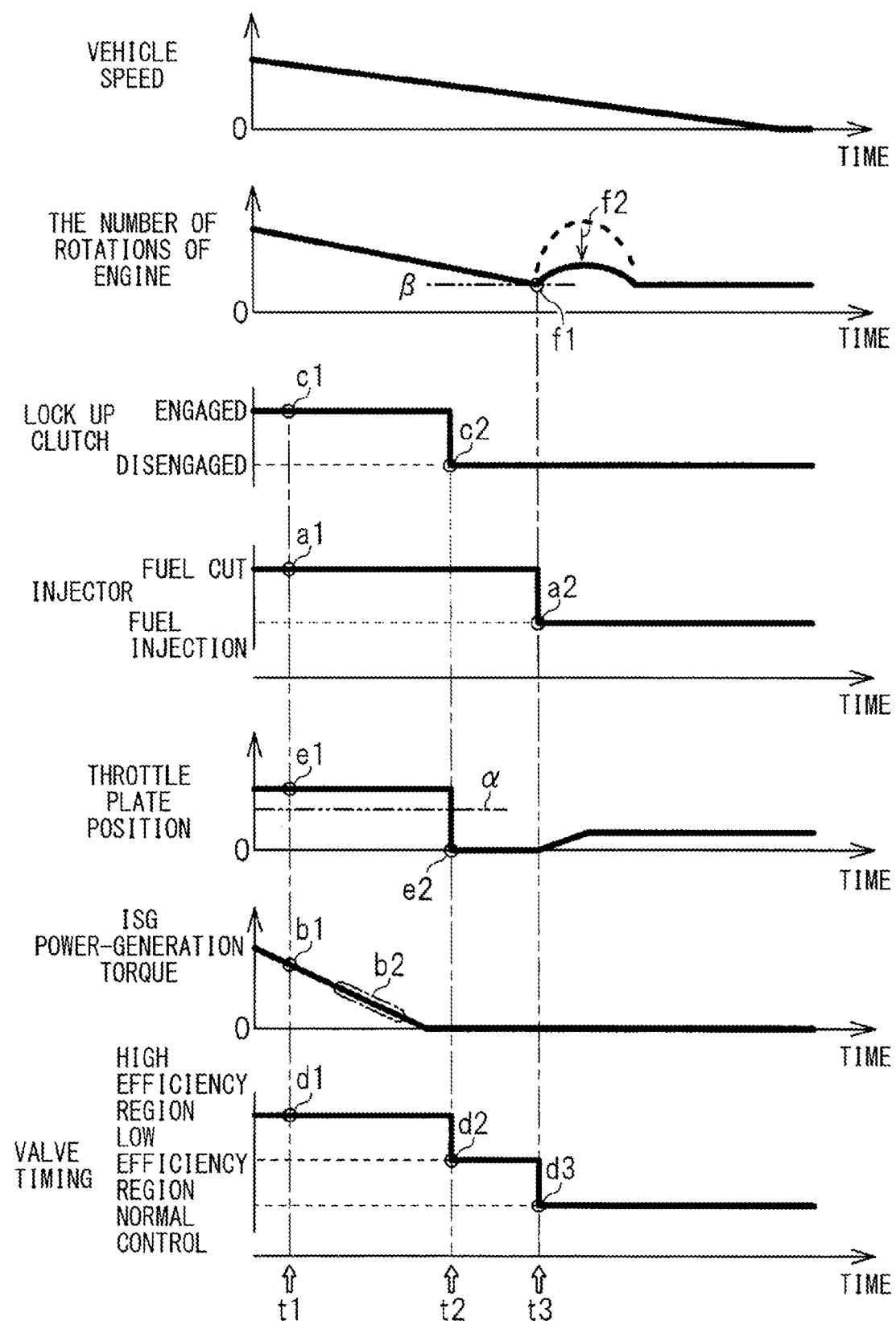
FIG. 11 is a timing chart illustrating an example of operation states of various devices in a regenerative power-generation control.

As described above, from viewpoint of the enhancement in the energy efficiency of the vehicle 11 and the enhancement in the fuel consumption performance, on the decelerated travel, e.g., in the coasting, the starter generator 16 may be controlled to the regenerative power-generation state, to convert much kinetic energy to electric energy and to recover the electric energy. In the following, described is a regenerative power-generation control on the decelerated travel, to be executed by the main controller 80. FIG. 11 is a timing chart illustrating an example of operation states of various devices in the regenerative power-generation control. The decelerated travel as illustrated in FIG. 11 may be the coasting in which the stepping down of the accelerator pedal and the brake pedal is released. In FIG. 11, reference characters "ISG" means the starter generator 16.

At time t1 illustrated in FIG. 11, in the coasting in which the stepping down of the accelerator pedal is released, the engine 12 may be controlled to the fuel cut state (reference characters a1). The starter generator 16 may be controlled to the regenerative power-generation state (reference characters b1). The lock up clutch 21 may be controlled to the engaged state (reference characters c1). Thus, in the coasting in which regenerative power-generation is performed, the lock up clutch 21 may be controlled to the engaged state. This makes it possible to efficiently transmit rotational power from the wheels 20 to the starter generator 16. It is therefore possible to enhance regenerative torque, i.e., the power-generation torque, of the starter generator 16, and to increase the power-generated electric power in the coasting.

Moreover, at the time t1 illustrated in FIG. 11, in the coasting in which the regenerative power-generation is performed, the valve timing of the intake valve 40 and the exhaust valve 41 is controlled to the high efficiency region (reference characters d1). In other words, in the coasting, the valve timing of the engine 12 is controlled to the high efficiency region illustrated in FIGS. 3 and 4, i.e., the regions A1 to A4. In this way, controlling the engine 12 to the high efficiency region makes it possible to increase the amount of the intake air of the engine 12, and to reduce the pumping loss of the engine 12. This leads to reduction in the number of executions of engine braking in the coasting. It is therefore possible to increase the power-generation torque without excessively increasing vehicle deceleration, and to increase the power-generated electric power in the coasting without giving an occupant a sense of incongruity.

Furthermore, at the time t1 illustrated in FIG. 11, in the coasting in which the regenerative power-generation is performed, the throttle valve 31 may be controlled openwise (reference characters e1). It is to be noted that the term "openwise" of the throttle valve 31 means a direction in which the throttle plate position becomes larger than a predetermined value α, while the term "closewise" of the throttle valve 31 means a direction in which the throttle plate position becomes smaller than the predetermined value α. As mentioned above, controlling the throttle valve 31 openwise in the coasting makes it possible to increase the amount of the intake air of the engine 12, and to reduce the pumping loss of the engine 12. This leads to the reduction in the number of executions of the engine braking in the coasting. It is therefore possible to increase the power-generation torque without excessively increasing the vehicle deceleration, and to increase the power-generated electric power without giving the occupant the sense of incongruity. It is to be noted that as denoted by reference characters b2, in allowing the starter generator 16 to perform the regenerative power-generation, the power-generation torque may be gradually lowered in accordance with a decrease in the vehicle speed, in order to keep the vehicle deceleration from increasing excessively.

At time t2 illustrated in FIG. 11, upon the lock up clutch 21 being switched from the engaged state to the disengaged state (reference characters c2), the valve timing of the intake valve 40 and the exhaust valve 41 is controlled to the low efficiency region (reference characters d2). In other words, upon disengagement of the lock up clutch 21, the valve timing of the engine 12 is controlled to the low efficiency region illustrated in FIGS. 3 and 4, i.e., the regions A5 to A8. Moreover, at the time t2 illustrated in FIG. 11, upon the lock up clutch 21 being switched from the engaged state to the disengaged state (reference characters c2), the throttle valve 31 may be controlled closewise (reference characters e2). It is to be noted that in the illustrated example, in controlling the throttle valve 31 closewise, the throttle valve 31 is closed to a fully closed position. However, this is non-limiting. The throttle valve 31 may be open within a range in which the throttle plate position is smaller than the predetermined value α. Non-limiting examples of conditions on which the lock up clutch 21 is disengaged on the decelerated travel may include that the vehicle speed is lower than a predetermined value, that the vehicle deceleration is higher than a predetermined value, and that the number of rotations of the engine is smaller than a predetermined value. However, these example conditions are non-limiting.

Thereafter, at time t3 illustrated in FIG. 11, upon the number of rotations of the engine reaching a predetermined lower limit β (reference characters f1), the fuel injection into the engine 12 may be restarted (reference characters a2), from viewpoint of prevention of engine stall. In other words, in a case where the number of rotations of the engine has lowered to reach the lower limit β, the engine 12 may be switched from the fuel cut state to the fuel injection state. The restart of the fuel injection into the engine 12 causes the engine torque to be outputted to be directed toward acceleration of the vehicle 11. This contributes to a decrease in the vehicle deceleration, resulting in the possibility of the sense of incongruity given to the occupant.

As described above, however, upon the disengagement of the lock up clutch 21, the valve timing may be switched from the high efficiency region to the low efficiency region (reference characters d2). This makes it possible to reduce the amount of the intake air of the engine 12, in preparation for the restart of the fuel injection. It is therefore possible to reduce the engine torque to be outputted by the fuel injection to a small value, allowing for the restart of the fuel injection without giving the sense of incongruity to the occupant. Furthermore, upon the disengagement of the lock up clutch 21, as indicated by reference characters e2, the throttle valve 31 may be controlled from openwise to closewise. This makes it possible to reduce the amount of the intake air of the engine 12, in preparation for the restart of the fuel injection. It is therefore possible to reduce the engine torque to be outputted by the fuel injection to the small value, allowing for the restart of the fuel injection without giving the sense of incongruity to the occupant. It is to be noted that at the restart of the fuel injection into the engine 12, an ignition retard angle control may be executed. The ignition retard angle control may include retarding the ignition timing of the engine 12. Execution of the ignition retard angle control allows for further reduction in the engine torque.

Moreover, at the time t3 illustrated in FIG. 11, upon the restart of the fuel injection into the engine 12, the valve timing of the intake valve 40 and the exhaust valve 41 may be normal-controlled (reference characters d3) on the basis of, for example, the number of rotations of the engine, the vehicle speed, and the throttle plate position. In other words, the control of the valve timing to the low efficiency region may be continued until the restart of the fuel injection into the engine 12. This makes it possible to sufficiently reduce the amount of the intake air of the engine 12 until the restart of the fuel injection into the engine 12. It is therefore possible to suppress the engine torque to be outputted in accompaniment with the restart of the fuel injection.

As described so far, in the case where the lock up clutch 21 is switched from the engaged state to the disengaged state on the decelerated travel, the valve timing is controlled with a switchover from the high efficiency region to the low efficiency region. This makes it possible to reduce the amount of the intake air of the engine 12, in preparation for the restart of the fuel injection. It is therefore possible to suppress racing of the number of rotations of the engine in accompaniment with the restart of the fuel injection, as indicated by an arrow f2 in FIG. 11. In other words, it is possible to reduce the amount of the intake air, in preparation for the restart of the fuel injection, even in a case where the valve timing is controlled to the high efficiency region on the decelerated travel from viewpoint of getting an adequate amount of the power-generated electric power in the regenerative power-generation. Hence, it is possible to reduce the engine torque to be outputted in accompaniment with the restart of the fuel injection to the small value.

[Other Examples of High Efficiency Region and Low Efficiency Region]

Figure 12:
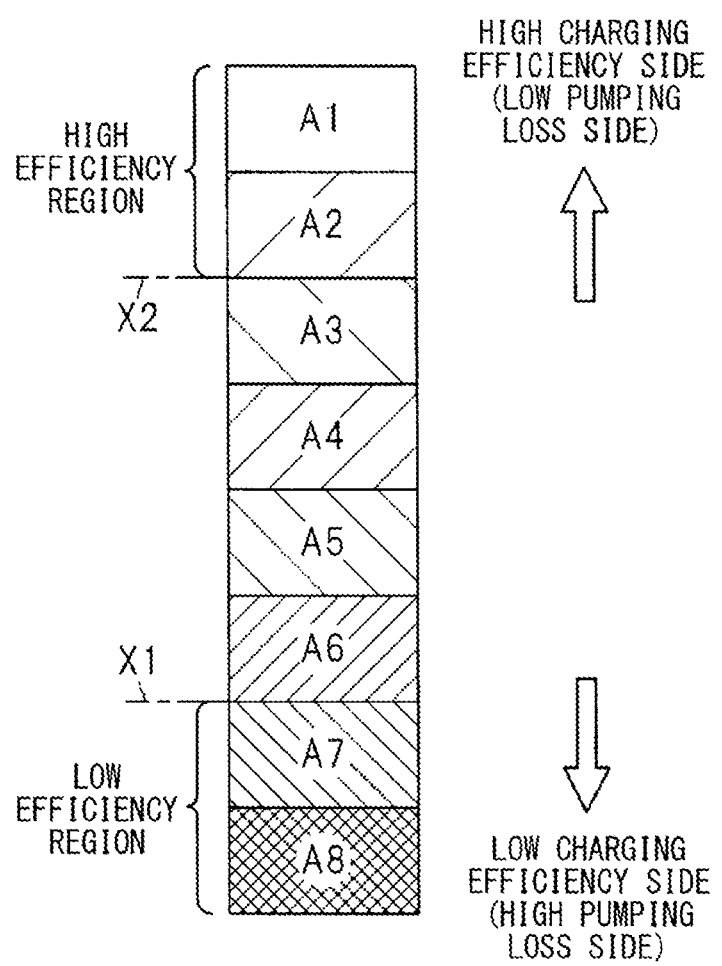
FIG. 12 illustrates another example of the high efficiency region and the low efficiency region.

In the forgoing description, the regions A1 to A4 are set as the high efficiency region of the valve timing, while the regions A5 to A8 are set as the low efficiency region of the valve timing. The regions A1 to A4 are the regions in which the charging efficiency of the engine 12 is raised to the higher value than the predetermined threshold X. The regions A5 to A8 are the regions in which the charting efficiency of the engine 12 is lowered to the smaller value than the predetermined threshold X. However, this is non-limiting. FIG. 12 illustrates another example of the high efficiency region and the low efficiency region. It is to be noted that in FIG. 12, the same regions as those in FIG. 3 are denoted by the same reference characters. Referring to FIG. 12, the regions A7 and A8 may be set as the low efficiency region of the valve timing, while the regions A1 and A2 may be set as the high efficiency region of the valve timing. The regions A7 and A8 may be regions in which the charging efficiency of the engine 12 is lowered to a smaller value than a predetermined first threshold X1. The regions A1 and A2 may be regions in which the charging efficiency of the engine 12 is raised to a higher value than a predetermined threshold X2 on higher-efficiency side than the first threshold X1. As illustrated in FIG. 12, it is possible to produce similar effects to those described above, even in a case where the high efficiency region and the low efficiency region are set in spaced relation from each other.

Moreover, in the forgoing description, the high efficiency region and the low efficiency region of the valve timing are described by giving the example as illustrated in FIG. 3. However, examples of the high efficiency region and the low efficiency region are not limited to as illustrated in FIG. 3. FIGS. 13A, 13B, 13C, 14A, 14B, and 14C illustrate other examples of the relation between the valve timing and the charging efficiency. In FIGS. 13A to 13C and 14A to 14C, a region exhibiting the same charging efficiency as that of the region A1 as the high efficiency region illustrated in FIG. 3 is denoted by the same reference characters A1. A region exhibiting the same charting efficiency as that of the region A8 as the low efficiency region illustrated in FIG. 3 is denoted by the same reference characters A8.

Figure 13A:
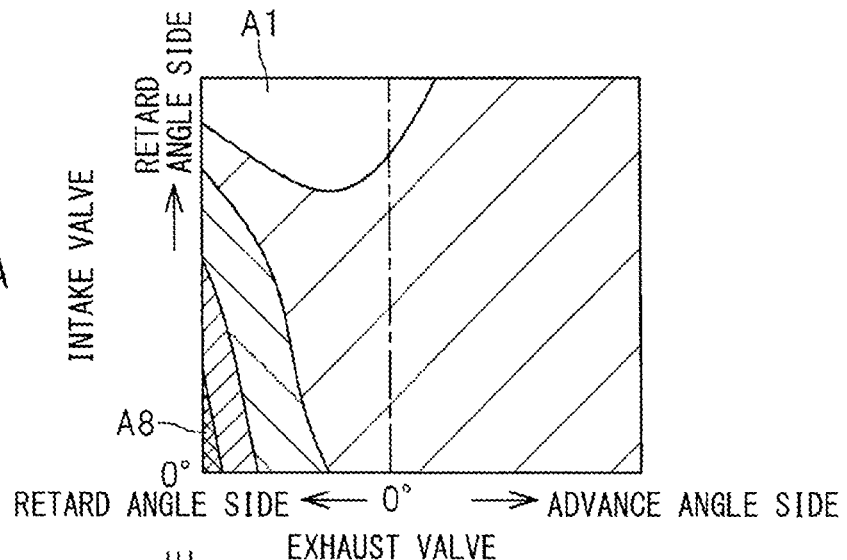
FIGS. 13A to 13C illustrate other examples of the relation between the valve timing and the charging efficiency.
Figure 13B:
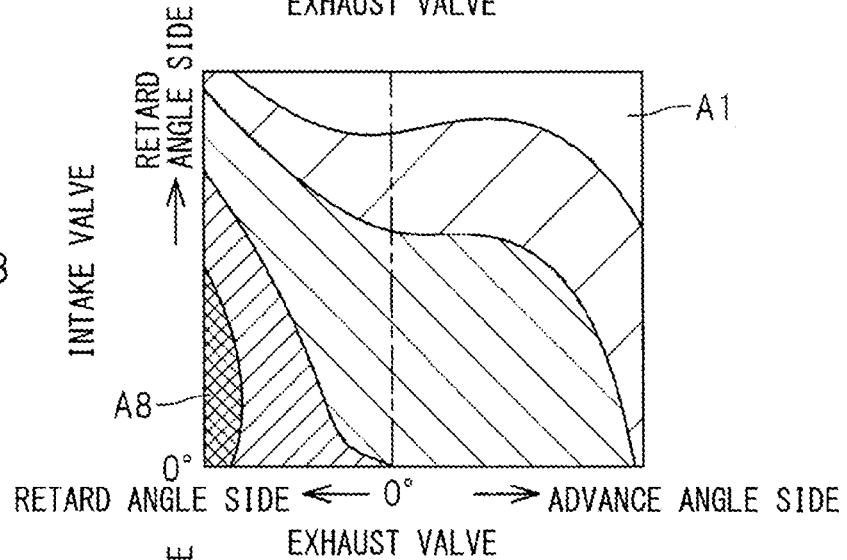
Figure 13C:
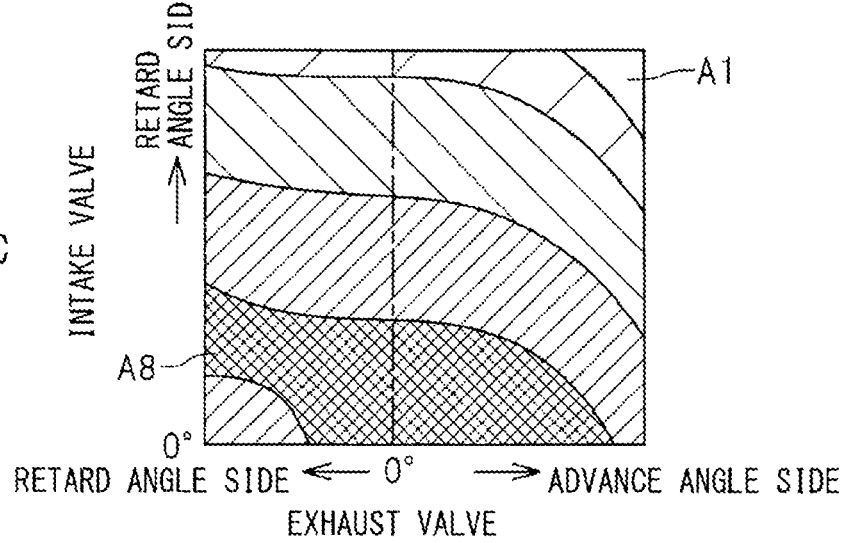
Figure 14A:
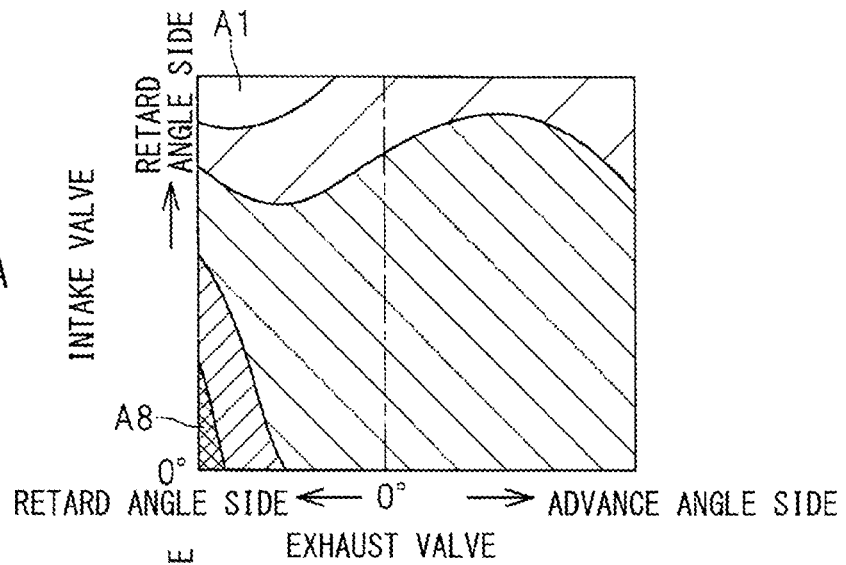
FIGS. 14A to 14C illustrate other examples of the relation between the valve timing and the charging efficiency.
Figure 14B:
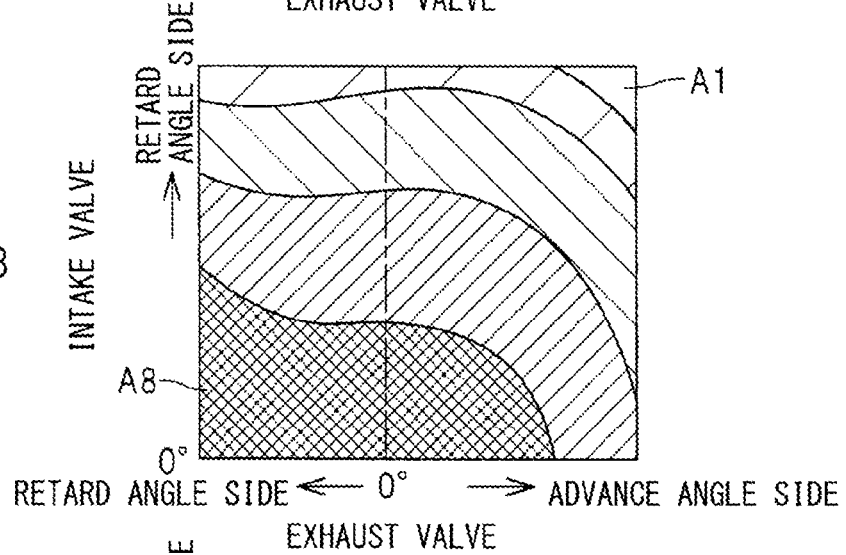
Figure 14C:
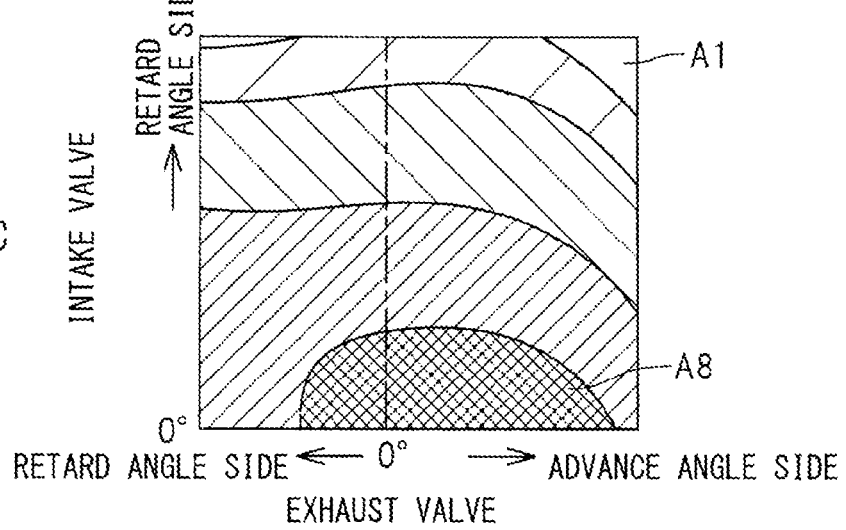

FIG. 13A illustrates regions of the charging efficiency in a case where the throttle plate position is 10° and the number of rotations of the engine is 1000 rpm. FIG. 13B illustrates regions of the charging efficiency in a case where the throttle plate position is 10° and the number of rotations of the engine is 3000 rpm. FIG. 13C illustrates regions of the charging efficiency in a case where the throttle plate position is 10° and the number of rotations of the engine is 5000 rpm. FIG. 14A illustrates regions of the charging efficiency in a case where the throttle plate position is 5° and the number of rotations of the engine is 1000 rpm. FIG. 14B illustrates regions of the charging efficiency in a case where the throttle plate position is 5° and the number of rotations of the engine is 3000 rpm. FIG. 14C illustrates regions of the charging efficiency in a case where the throttle plate position is 5° and the number of rotations of the engine is 5000 rpm.

As illustrated in FIGS. 13A to 13C and 14A to 14C, the region A1 as the high efficiency region and the region A8 as the low efficiency region may be regions changing with the throttle plate position, and regions changing with the number of rotations of the engine. In other words, in controlling the engine 12 in the region A1 as the high efficiency region or the region A8 as the low efficiency region, neither a control target of the valve timing of the intake valve 40 nor a control target of the valve timing of the exhaust valve 41 is uniquely decided. In other words, in controlling the engine 12 in region A1 as the high efficiency region or the region A8 as the low efficiency region, the control target of the valve timing of the intake valve 40 and the exhaust valve 41 may be a target value decided on the basis of, for example, the throttle plate position and the number of rotations of the engine.

Although some implementations of the technology have been described in the forgoing with reference to the accompanying drawings, the technology is by no means limited to the implementations described above. Various changes and modifications may be made to any implementation without departing from the scope of the technology. In the forgoing description, used is the variable valve mechanism 42 that changes the valve timing of the intake valve 40 and the exhaust valve 41. However, this is non-limiting. For example, a variable valve mechanism may be adopted that controls the valve timing solely of the intake valve 40, or alternatively, a variable valve mechanism may be adopted that controls the valve timing solely of the exhaust valve 41. It is possible to control the engine 12 to the high efficiency region and the low efficiency region, even in a case with the valve timing solely of the intake valve 40 being controlled. It is possible to control the engine 12 to the high efficiency region and the low efficiency region, even in a case with the valve timing solely of the exhaust valve 41 being controlled. In another alternative, the variable valve mechanism 42 may be a variable valve mechanism that changes amounts of lift or operation angles of the intake valve 40 and the exhaust valve 41.

In the forgoing description, the decelerated travel of the vehicle 11 is exemplified by the coasting, i.e., inertia travel. However, this is non-limiting. For example, the valve timing may be switched from the high efficiency region to the low efficiency region, at timing of the disengagement of the lock up clutch 21, on the decelerated travel on which the vehicle 11 decelerates, with the brake pedal being stepped down. Moreover, in the forgoing description, the starter generator 16 is adopted as the "electric generator". However, this is non-limiting. A generator may be adopted that is not used as an electric motor. Furthermore, in the forgoing description, in the main controller 80, incorporated are the electric generator control unit 81, the throttle control unit 82, the valve timing control unit 83, the clutch control unit 84, the injector control unit 85, and the ignition control unit 86. However, these control units may be incorporated in another controller, or alternatively, these control units may be distributed in other controllers.

The engine 12 as illustrated in the figures is a horizontally opposed engine, but this is non-limiting. Other types of engines may be adopted. Moreover, in the forgoing description, the two electricity storage devices are coupled to the starter generator 16, but this is non-limiting. A single electricity storage device may be coupled to the starter generator 16. Furthermore, in the forgoing description, the lead battery 61 and the lithium-ion battery 62 are employed as the electricity storage devices to be coupled to the starter generator 16. However, this is non-limiting. Other kinds of batteries or capacitors may be adopted. Moreover, in the example illustrated in FIGS. 1 and 5, the switch SW2 is provided on the positive electrode line 64 of the lithium-ion battery 62. However, this is non-limiting. For example, as indicated by an alternate long and short dashed line in FIG. 5, the switch SW2 may be provided on the negative electrode line 68 of the lithium-ion battery 62.

The main controller 80 illustrated in FIGS. 1, 2, and 6 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 80. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the main controller 80 illustrated in FIGS. 1, 2, and 6.

Although some implementations of the technology have been described in the forgoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus for a vehicle that includes an engine, the engine including an intake valve and an exhaust valve, the control apparatus comprising:
    an electric generator configured to be coupled to the engine, the electric generator being driven by a crankshaft of the engine;
    a lock up clutch configured to be coupled to the engine; and
    a valve timing controller configured to control a valve timing of at least one of the intake valve and the exhaust valve,
    wherein the valve timing controller is configured to control the valve timing to a low efficiency region and a high efficiency region, the low efficiency region being a region in which a charging efficiency of the engine is lowered to a lower value than a threshold, and the high efficiency region being a region in which the charging efficiency of the engine is raised to a higher value than the threshold,
    wherein the valve timing controller is configured to control the valve timing to the high efficiency region on a condition that the electric generator performs a regenerative power-generation on a decelerated travel of the vehicle,
    wherein the lock up clutch is controlled to an engaged state on the decelerated travel of the vehicle, and
    wherein the valve timing controller is configured to switch, responsive to the lock up clutch being switched from the engaged state to a disengaged state while the valve timing has been controlled to the high efficiency region on the decelerated travel, the valve timing from the high efficiency region to the low efficiency region.

2. The control apparatus for the vehicle according to claim 1, wherein the valve timing controller keeps on controlling the valve timing to the low efficiency region, after controlling the valve timing to the low efficiency region on the condition that the lock up clutch is switched to the disengaged state, until the engine is switched from a fuel cut state to a fuel injection state.

3. The control apparatus for the vehicle according to claim 1, wherein the low efficiency region is a region in which the charging efficiency of the engine is lowered to a lower value than a first threshold, and
    wherein the high efficiency region is a region in which the charging efficiency of the engine is raised to a higher value than a second threshold on a higher-efficiency side than the first threshold.

4. The control apparatus for the vehicle according to claim 2, wherein the low efficiency region is a region in which the charging efficiency of the engine is lowered to a lower value than a first threshold, and
    wherein the high efficiency region is a region in which the charging efficiency of the engine is raised to a higher value than a second threshold on a higher-efficiency side than the first threshold.

5. The control apparatus for the vehicle according to claim 1, further comprising a throttle controller configured to control a throttle valve of the engine,
    wherein the throttle controller is configured to control the throttle valve openwise, on the condition that the electric generator performs the regenerative power-generation on the decelerated travel, and
    wherein the throttle controller is configured to control the throttle valve closewise, on the condition that the lock up clutch is controlled from the engaged state to the disengaged state, with the throttle valve having been controlled openwise on the decelerated travel.

6. The control apparatus for the vehicle according to claim 2, further comprising a throttle controller configured to control a throttle valve of the engine,
    wherein the throttle controller is configured to control the throttle valve openwise, on the condition that the electric generator performs the regenerative power-generation on the decelerated travel, and
    wherein the throttle controller is configured to control the throttle valve closewise, on the condition that the lock up clutch is controlled from the engaged state to the disengaged state, with the throttle valve having been controlled openwise on the decelerated travel.

7. The control apparatus for the vehicle according to claim 3, further comprising a throttle controller configured to control a throttle valve of the engine,
    wherein the throttle controller is configured to control the throttle valve openwise, on the condition that the electric generator performs the regenerative power-generation on the decelerated travel, and
    wherein the throttle controller is configured to control the throttle valve closewise, on the condition that the lock up clutch is controlled from the engaged state to the disengaged state, with the throttle valve having been controlled openwise on the decelerated travel.

8. The control apparatus for the vehicle according to claim 4, further comprising a throttle controller configured to control a throttle valve of the engine,
    wherein the throttle controller is configured to control the throttle valve openwise, on the condition that the electric generator performs the regenerative power-generation on the decelerated travel, and
    wherein the throttle controller is configured to control the throttle valve closewise, on the condition that the lock up clutch is controlled from the engaged state to the disengaged state, with the throttle valve having been controlled openwise on the decelerated travel.

9. A control apparatus for a vehicle that includes an engine, the engine including an intake valve and an exhaust valve, the control apparatus comprising:
    an electric generator configured to be coupled to the engine, the electric generator being driven by a crankhaft of the engine;
    a lock up clutch configured to be coupled to the engine; and
    a circuitry configured to control a valve timing of at least one of the intake valve and the exhaust valve,
    wherein the circuitry is configured to control the valve timing to a low efficiency region and a high efficiency region,
    wherein the low efficiency region is a region in which a charging efficiency of the engine is lowered to a lower value than a threshold, and the high efficiency region is a region in which the charging efficiency of the engine is raised to a higher value than the threshold,
    wherein the circuitry is configured to control the valve timing to the high efficiency region on a condition that the electric generator performs a regenerative power-generation on a decelerated travel of the vehicle,
    wherein the lock up clutch is controlled to an engaged state on the decelerated travel of the vehicle, and
    wherein the circuitry is configured to switch, responsive to the lock up clutch being switched from the engaged state to a disengaged state while the valve timing has been controlled to the high efficiency region on the decelerated travel, the valve timing from the high efficiency region to the low efficiency region.

10. The control apparatus for the vehicle according to claim 1, wherein the valve timing controller is configured to maintain, after the switching of the valve timing from the high efficiency region to the low efficiency region, the valve timing to the low efficiency region until a fuel injection into the engine is restarted.

11. The control apparatus for the vehicle according to claim 9, wherein the valve timing controller is configured to maintain, after the switching of the valve timing from the high efficiency region to the low efficiency region, the valve timing to the low efficiency region until a fuel injection into the engine is restarted.

12. The control apparatus for the vehicle according to claim 1, wherein the electric generator is mechanically coupled to the crankshaft of the engine, and functions as an electric motor that causes rotation of the crankshaft.

13. The control apparatus for the vehicle according to claim 9, wherein the electric generator is mechanically coupled to the crankshaft of the engine, and functions as an electric motor that causes rotation of the crankshaft.

14. The control apparatus for the vehicle according to claim 1, wherein the electric generator includes a power-generation suspended state in which generating a power is stopped, and a regenerative power-generation state in which a kinetic energy of the vehicle is retrieved at the decelerated travel as an electric energy, wherein, before the lock up clutch is switched from the engaged state to the disengaged state, a power-generation torque of the electric generator decreases to switch the electric generator from the regenerative power-generation state to the power-generation suspended state on the decelerated travel of the vehicle, and wherein the power-generation suspended state continues, after the switching the electric generator from the regenerative power-generation state to the power-generation suspended state, until a fuel injection to the engine is restarted after a fuel cut for the decelerated travel of the vehicle.

15. The control apparatus for the vehicle according to claim 9, wherein the electric generator includes a power-generation suspended state in which generating a power is stopped, and a regenerative power-generation state in which a kinetic energy of the vehicle is retrieved at the decelerated travel as an electric energy, wherein, before the lock up clutch is switched from the engaged state to the disengaged state, a power-generation torque of the electric generator decreases to switch the electric generator from the regenerative power-generation state to the power-generation suspended state on the decelerated travel of the vehicle, and wherein the power-generation suspended state continues, after the switching the electric generator from the regenerative power-generation state to the power-generation suspended state, until a fuel injection to the engine is restarted after a fuel cut for the decelerated travel of the vehicle.

* * * * *